(12) United States Patent
Thorsell et al.

(10) Patent No.: US 8,256,814 B2
(45) Date of Patent: Sep. 4, 2012

(54) CONSOLE MEDIA AND CORD MULTI-POSITION MANAGEMENT SYSTEM

(75) Inventors: Roy Thorsell, Clawson, MI (US); Thomas A. Miller, Royal Oak, MI (US)

(73) Assignee: Toyoda Gosei Co. Ltd., Gun Aichi (JP)

(*) Notice: Subject to any disclaimer, the term of this patent is extended or adjusted under 35 U.S.C. 154(b) by 0 days.

(21) Appl. No.: 12/960,850

(22) Filed: Dec. 6, 2010

(65) Prior Publication Data
US 2011/0156418 A1 Jun. 30, 2011

Related U.S. Application Data

(60) Provisional application No. 61/290,354, filed on Dec. 28, 2009.

(51) Int. Cl.
*B60R 7/04* (2006.01)
(52) U.S. Cl. .................. 296/24.34; 296/37.8
(58) Field of Classification Search ............ 296/24.34, 296/37.1, 37.8, 37.12
See application file for complete search history.

(56) References Cited

U.S. PATENT DOCUMENTS

| | | | |
|---|---|---|---|
| 4,537,439 A * | 8/1985 | Otani | 296/37.9 |
| 5,199,449 A * | 4/1993 | Dabringhaus et al. | 131/231 |
| 6,129,400 A | 10/2000 | Jakubiec et al. | |
| 6,497,443 B2 * | 12/2002 | Worrell et al. | 296/37.8 |
| 6,761,388 B2 | 7/2004 | Lein et al. | |
| 7,111,883 B1 | 9/2006 | Patel et al. | |
| 7,147,259 B2 | 12/2006 | Radu et al. | |
| 7,413,229 B2 | 8/2008 | Kukucka et al. | |
| 7,429,068 B2 | 9/2008 | Busha et al. | |
| 7,469,951 B2 * | 12/2008 | Welschholz et al. | 296/37.8 |
| 2003/0047955 A1 | 3/2003 | Bruhnke et al. | |
| 2007/0124895 A1 | 6/2007 | Brown | |
| 2010/0090491 A1 * | 4/2010 | Hipshier et al. | 296/24.34 |

FOREIGN PATENT DOCUMENTS

WO 2008/114978 A1 9/2008

OTHER PUBLICATIONS

Search Report & Written Opinion dated Mar. 10, 2011; PCT/US2010/059059.

* cited by examiner

*Primary Examiner* — Dennis Pedder
(74) *Attorney, Agent, or Firm* — Dobrusin & Thennisch PC (57) ABSTRACT

The present invention is directed to a unique solution for a storage console with a cord and media management system, including a movable tray assembly, for a vehicle that allows for provides a convenient system for display, storage (general storage and otherwise), power supply and other features for any number of media devices.

4 Claims, 7 Drawing Sheets

CONSOLE MEDIA AND CORD MULTI-POSITION MANAGEMENT SYSTEM

CLAIM OF PRIORITY

The present application claims the benefit of the filing date of U.S. Provisional Application No. 61/290,354, filed on Dec. 28, 2009, hereby incorporated by reference.

FIELD OF THE INVENTION

The present invention relates to a console for a vehicle, more particularly to a floor storage console with a cord and media management system for a vehicle.

BACKGROUND

Efforts to improve the functionality of storage systems in vehicles (e.g. cars, trucks and vans) are an on-going endeavor among Original Equipment Manufacturers (OEM) and the numerous component/system suppliers. Of particular interest is the desire to utilize the limited packaging space of a vehicle in such a way as to provide efficient and user friendly features for the vehicle user. It has become increasingly common for vehicle users to carry a number of devices, such as phones, MP3 players, PDAs and the like. It is desirous for the vehicle to provide convenient system for display, storage, power supply and other features for these and other items. It is believed, that for example, when no such convenient system is available, users may utilize things like the cup holder to hold the device and any attached power cord would be just lying about. The present invention is directed one such innovative solution to provide a convenient system.

Among the literature that may pertain to this technology include the following patent documents: U.S. Pat. No. 6,129,400; US 2003/0047955; U.S. Pat. No. 6,761,388; U.S. Pat. No. 7,111,883; U.S. Pat. No. 7,147,259; U.S. Pat. No. 7,413,229; and U.S. Pat. No. 7,429,068, all incorporated herein by reference for all purposes.

SUMMARY OF THE INVENTION

The present invention is directed to a unique solution to one or more of the problems discussed above. It is believed that the present invention provides a unique design that provides the ability for increased utilization, features, and functionality of the limited package space of a vehicle. Particularly, the present invention provides a convenient system for display, storage (general storage and otherwise), power supply and other features for any number of media devices. It is contemplated that the system is tailored for use at or near the floor of a vehicle (e.g. anywhere between the floor pan and the top of an instrument panel), although it may be located anywhere within the vehicle.

Accordingly, pursuant to a first aspect of the present invention, there is contemplated a storage console with a cord and media management system for a vehicle including a system base unit; a movable tray assembly; at least one media device holder disposed on the movable tray assembly; and a power supply feature.

The invention may be further characterized by one or any combination of the features described herein, such as: at least one interface device that functions to provide an interface to the vehicle; at least one door; the at least one media device holder is rotatably connected to the movable tray assembly; the movable tray assembly includes a cord guide; the movable tray assembly can be placed in an inverted position.

It should be appreciated that the above referenced aspects and examples are non-limiting, as others exist within the present invention, as shown and described herein.

DETAILED DESCRIPTION OF THE PREFERRED EMBODIMENT

Figure 1:
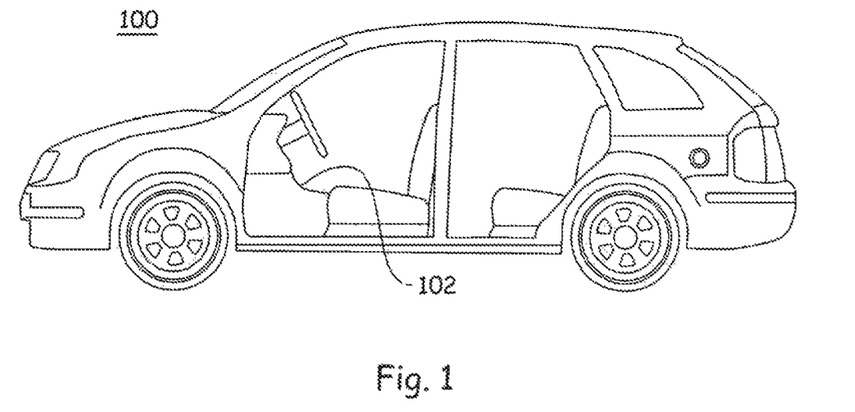
FIG. 1 is a side view of an exemplary vehicle with a console.
Figure 2:
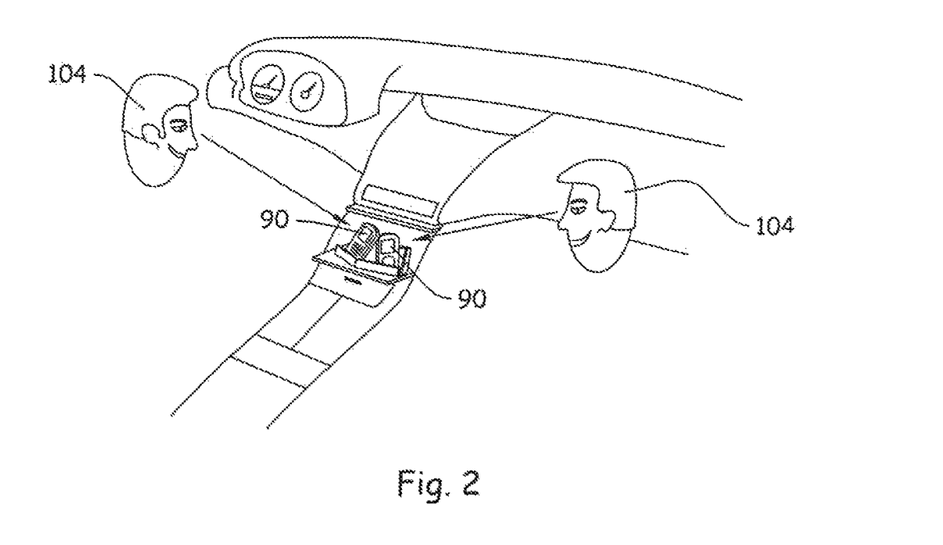
FIG. 2 is a perspective view of an exemplary vehicle dash board with an exemplary console with a cord and media management system according to the present invention.

The present invention is directed to a unique solution for a storage console with a cord and media management system 10 for a vehicle (e.g. a automobile 100, as illustrated in FIG. 1) that allows for provides a convenient system for display, storage (general storage and otherwise), power supply and other features for any number of media devices (e.g. phone, PDA, MP3, GPS, etc.). The examples provided in this application will focus on a storage console may be part of a larger vehicle console 102, as illustrated in FIG. 2, although a stand-alone unit is contemplated.

The present invention is illustrated in a number of exemplary embodiments, as shown in FIGS. 3-8. The present invention, a storage console with a cord and media management system 10, should be capable of providing convenient media device display, storage (as well as general storage), cord management, and power supply features. Generally, the system 10 may be described a three dimensional "box" (system base unit 12) with geometric features such as a height 14, width 16, and depth 18. It is contemplated and should be appreciated that these geometric features may vary at different areas of the system (e.g. deeper at the base, wider in the middle, etc.), depending on design choices and overall package space. The system 10 may include a movable tray assembly 30, with at least one media device holder 40 disposed thereon, a power supply means/feature 50, and a number of other communication or interface devices 60 (e.g. USB, IEEE 1394, audio, video, and data ports). It is also contemplated that the system may include at least one door, but as illustrated with an upper door 70 and a lower door 80. These doors 70, 80 which may function to close off at least a portion of the system 10 and provide other functionality as discussed in subsequent paragraphs. Each of the components detailed below may be constructed of any number of materials (e.g. plastics, metals, ceramics, etc.) that one skilled in the art would recognize as an appropriate material for the desired functional aspects and the general environmental conditions that the system is subject to (e.g. a vehicle interior).

Each of the components introduced above will be further detailed in the paragraphs below and in descriptions of illustrative examples/embodiments.

System Base Unit 12

The system base unit 12 may serve to provide a base structure for the system 10. It may be a unitary piece (e.g. preferably a single molded or cast piece of plastic) or be an assembly of multiple pieces. The unit 12 may be a stand-alone unit or may also be part of larger vehicle console 102 and located within the larger console 102. The base unit 12 may be further described as having at least upper and lower sections 20, 22, these sections separated by the movable tray assembly 30. Preferably, in the case where there are two doors, the upper door 70 and the lower door 80 cover/close off the upper and lower sections 20, 22 (when closed) respectfully.

Figure 4:
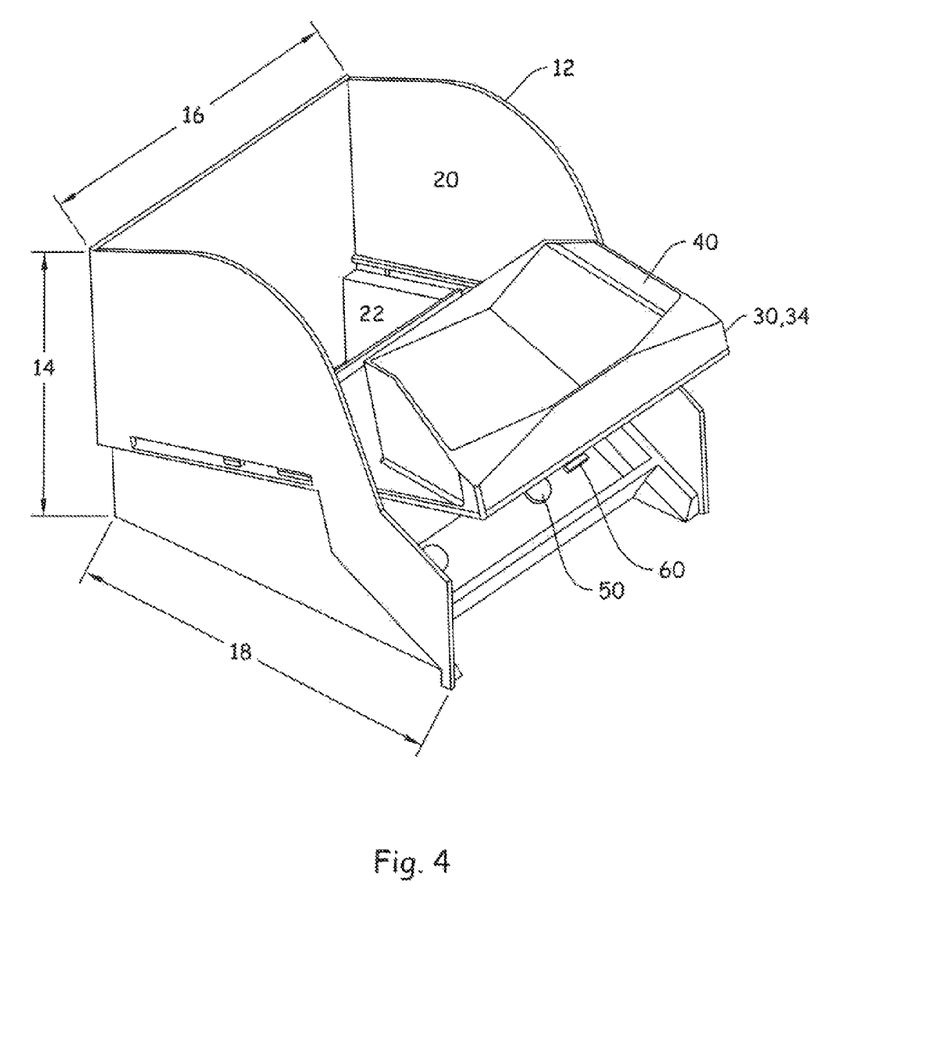
FIG. 4 is a perspective view of an exemplary system base unit and tray with the tray in a deployed position and media device holder in an upright position according to the present invention.
Figure 5:
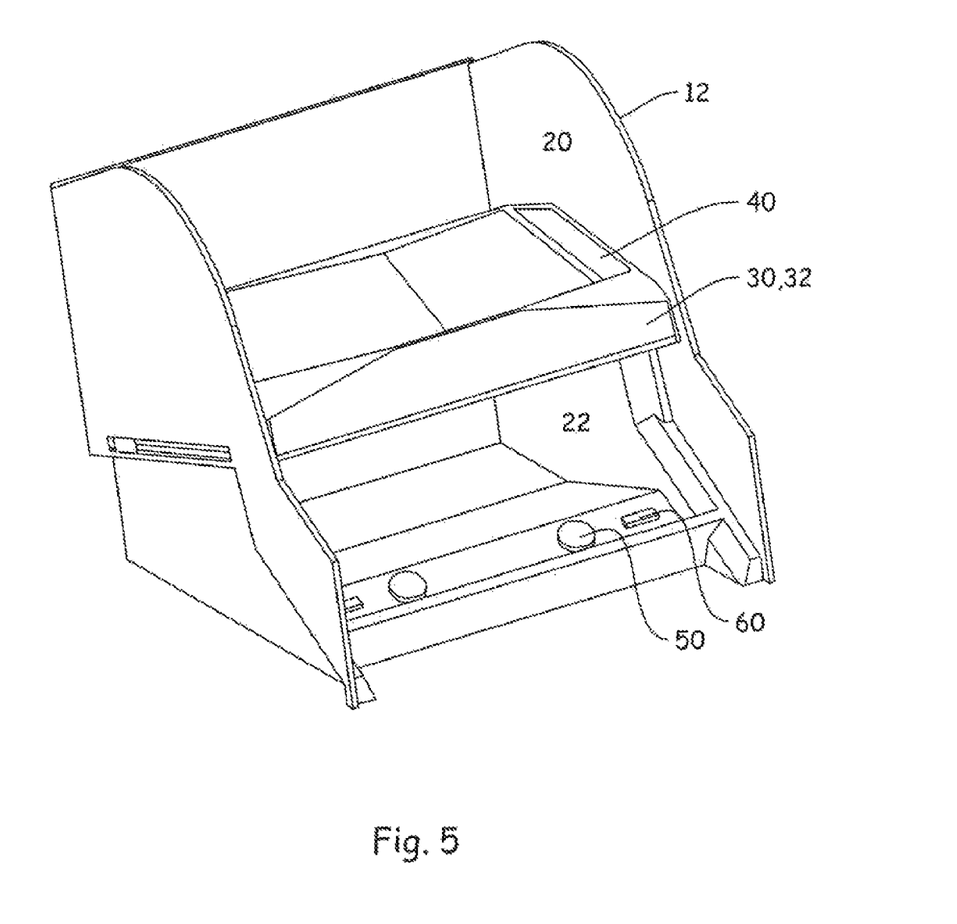
FIG. 5 is a perspective view of an exemplary system base unit and tray with the tray in an un-deployed position and media device holder in an upright position according to the present invention.

In an illustrative example, shown in FIGS. 4 and 5, the lower section 22 has the power supply means 50 and a plurality of interface devices 60 disposed therein. The upper section has the media device holder 40 disposed therein.

Figure 6:
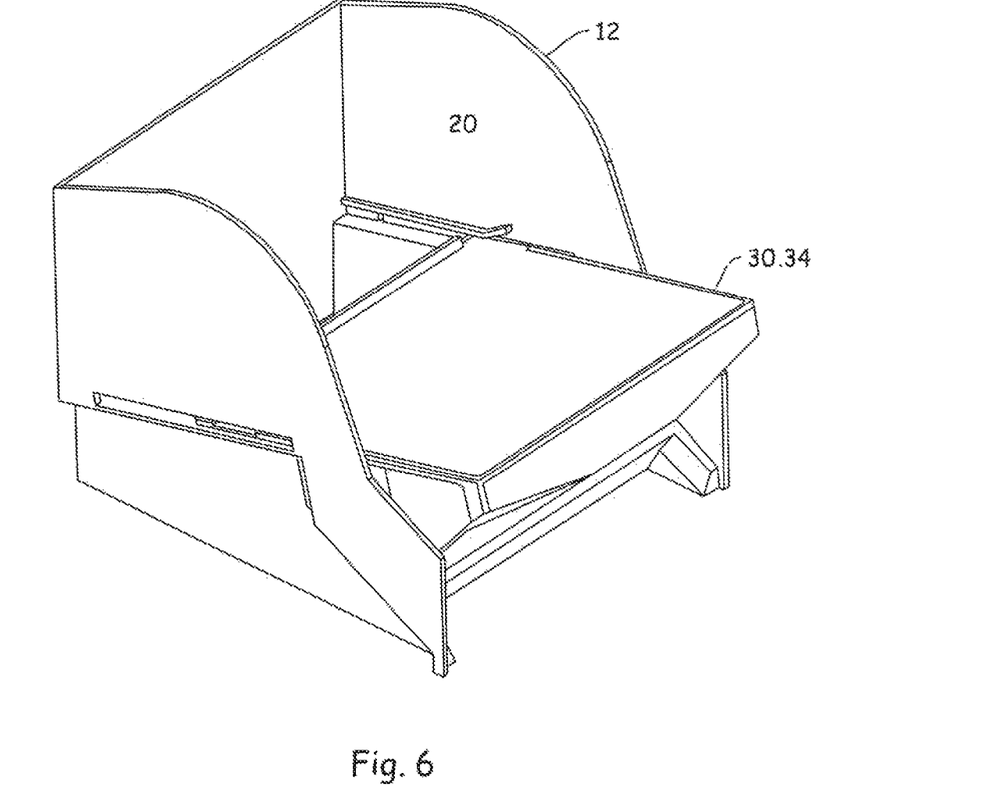
FIG. 6 is a perspective view of an exemplary system base unit and tray with the tray in a deployed position and media device holder in an inverted position according to the present invention.
Figure 7:
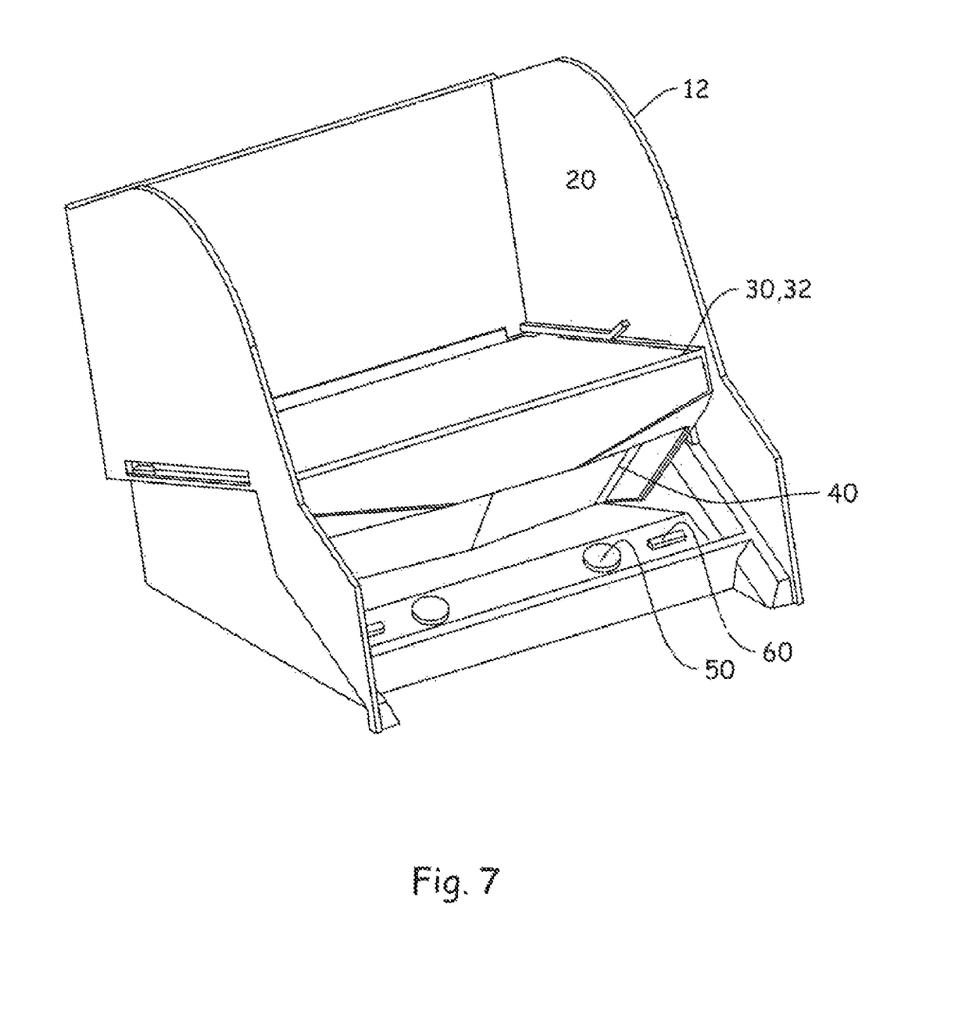
FIG. 7 is a perspective view of an exemplary system base unit and tray with the tray in an un-deployed position and media device holder in an inverted position according to the present invention.

In another illustrative example, shown in FIGS. 6 and 7, the lower section 22 has the media device holder 40 disposed therein, for example when the movable tray assembly 30 is in an inverted position.

The base unit 12 generally contains features that provide for the attachment of the other components (e.g. tray assembly 30, power supply means 50, interface devices 60, and doors 70, 80). It is contemplated that such features may include holes, clips, rails, and channels. Illustrative examples are described in further detail in the discussion of the respective component sections below.

Movable Tray Assembly 30

The movable tray assembly 30 may function as a storage platform, a display platform, and a cord guide or management system (e.g. for a power cord, interface cord or otherwise). The tray assembly 30 may be relatively flat or may include contours that aid in the retention of items placed on it. It also may include sections that have a surface with a higher coefficient of friction than also may aid in the retention of items placed on it.

The tray assembly 30 is movably attached to the base unit 12 and can be moved to a plurality of positions (e.g. a loaded (closed) position 32 and a deployed position 34). The tray assembly 30 may also be capable of being completely removed by a user from the unit 12 and placed in an inverted position (e.g. as shown in FIGS. 6 and 7). It is contemplated that the tray assembly 30 may move on track system or channel that is part of the base unit 12 (in the illustrative examples, one set of channels are shown, but it is contemplated that any number of channel sets located in various places in the base unit is possible). It also may interface with projections on the base unit 12 and be discretely movable from one projection to another. There may be locking features (e.g. detents or stops) in the base unit 12 and/or the tray assembly 30 that aid in controlling the position of the tray assembly 40. Preferably the tray assembly also includes at least one media device holder 40 disposed on one side, but it is contemplated that there may be multiple device holders 40 disposed on one side or on both.

The cord guide or cord management system may function to allow cords 92 to easily go between the upper and lower sections 20, 22 of the base unit 12. It also may provide a positive locking feature that may secure the cord 92. In an illustrative example, shown in FIG. 8E, the cord guide is a notch 36 in the rear of the tray assembly, although it is contemplated that such a notch may be placed anywhere on the periphery of the tray 30.

Figures 8A, 8B, 8C, 8D, 8E, 8F:
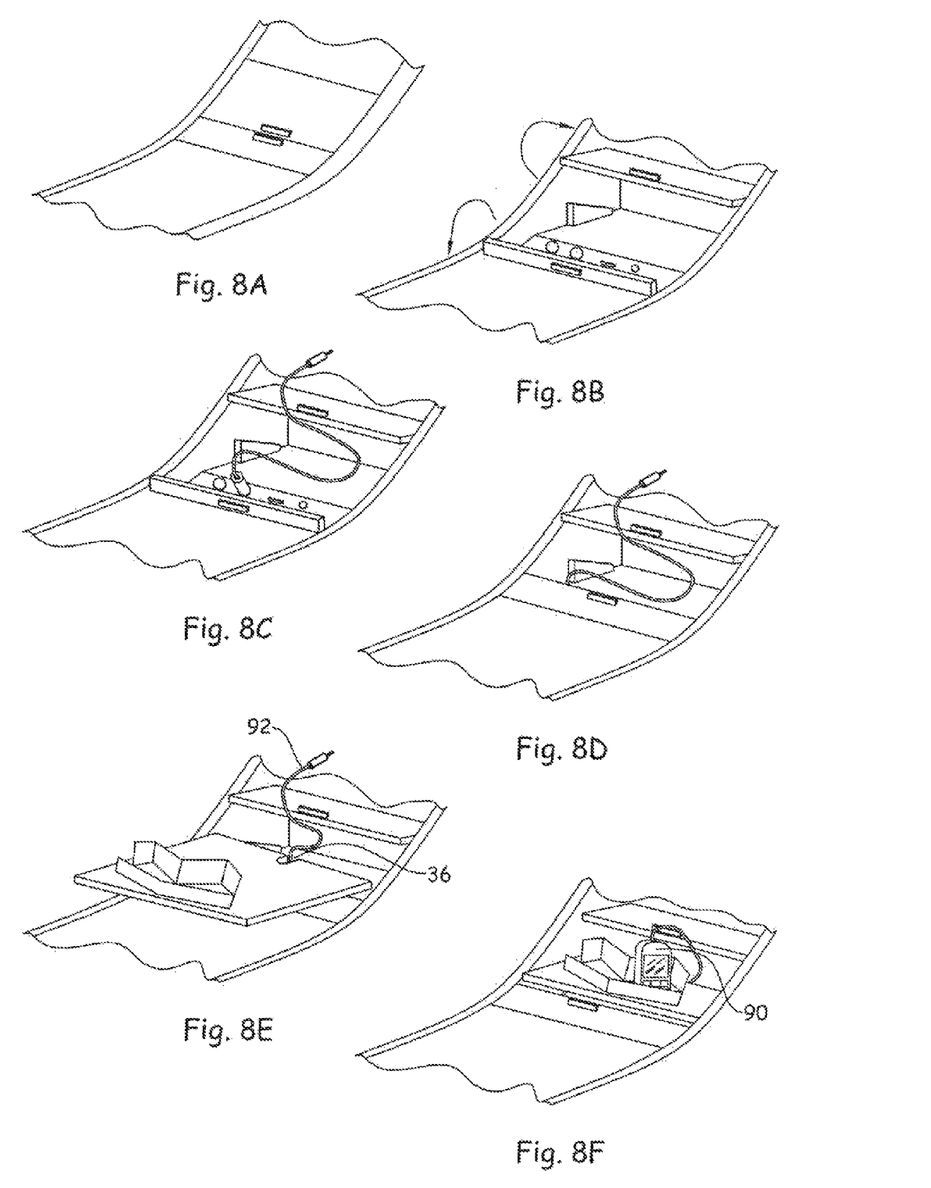
FIG. 8A is a perspective view of an exemplary cord and media management system with two doors closed according to the present invention.
FIG. 8B is a perspective view of an exemplary cord and media management system with two doors open and the tray removed according to the present invention.
FIG. 8C is a perspective view of an exemplary cord and media management system with two doors open, the tray removed, and a power cord shown according to the present invention.
FIG. 8D is a perspective view of an exemplary cord and media management system with the upper door open and the lower door closed, the tray removed, and a power cord shown according to the present invention.
FIG. 8E is a perspective view of an exemplary cord and media management system with the upper door open and the lower door closed, the tray in the process of being installed, and a power cord shown according to the present invention.
FIG. 8F is a perspective view of an exemplary cord and media management system with the upper door open and the lower door closed, the tray installed, and a power cord shown according to the present invention.

In one illustrative example, shown in FIGS. 8A-8F, the tray assembly has a device holder 40 on one side of the tray, the device holder 40 with two pockets for holding two devices, (e.g. two phones, two MP3 players, one phone and one MP3 player, etc.) although only one device 90 is shown. Also shown is a power cord 92 attached to the device 90 and to the power supply means/feature 50. In FIG. 8E the tray assembly is shown removed from the base unit 12 and in FIG. 8F, installed therein. In a preferred embodiment, when the tray 30 is in the deployed position 34 (as shown in FIG. 2), the device 90 is positioned such that it is easily seen by the user 104. Also, preferably the upper door may be closed.

Media Device Holder 40

The media device holder 40 may be adapted to function as a holding device for one or more devices 90. It may be affixed to the tray assembly in a single position or may be adjustably affixed thereto (e.g. movable fore/aft and/or rotateably movable relative to the tray assembly 30). The device holder 40 may be adapted to hold one or more devices 90. It is contemplated that the holder may accommodate devices 90 of numerous sizes and configurations and may include a means to securely hold the device 90 (e.g. flexible fingers or a swing arm).

In one illustrative example, as shown in FIGS. 2, 3B, 4, 5, 8E and 8F, the media device holder 40 includes places for two devices 90. The device holder 40 is configured such that each device is held in place and angled towards opposing users (e.g. driver and passenger), preferably whether the tray assembly 30 is in the closed or display positions.

Power Supply Means/Feature 50

Figures 3A, 3B:
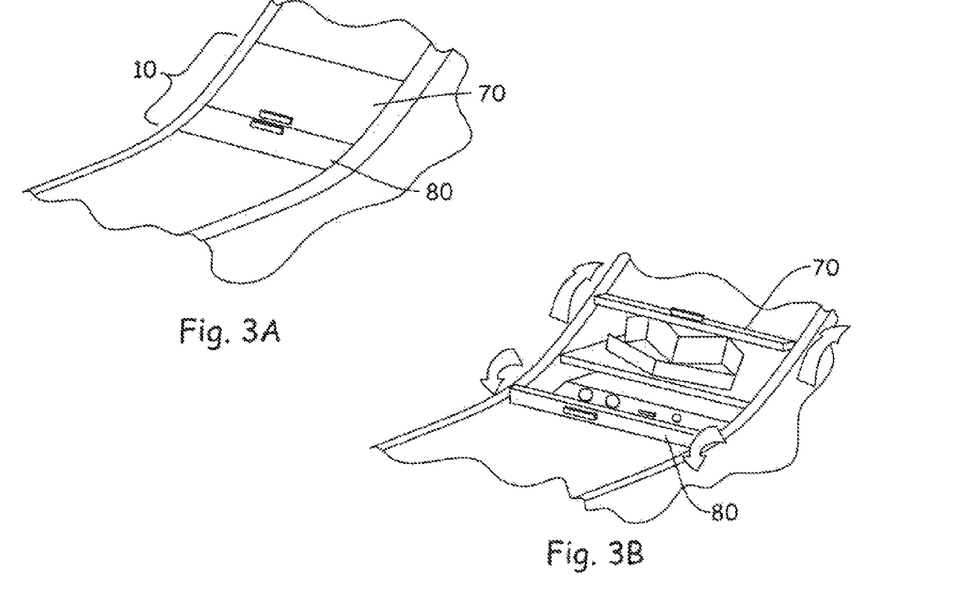
FIG. 3A is a perspective view of an exemplary cord and media management system with two doors closed according to the present invention.
FIG. 3B is a perspective view of an exemplary cord and media management system with two doors open according to the present invention.
Figure 3C:
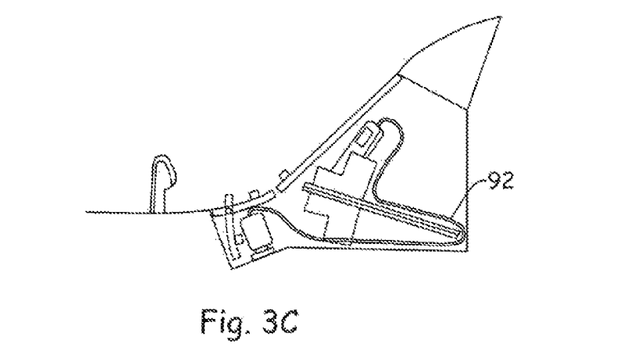
FIG. 3C is a side sectional view of an exemplary cord and media management system with two doors closed according to the present invention.
Figure 3D:
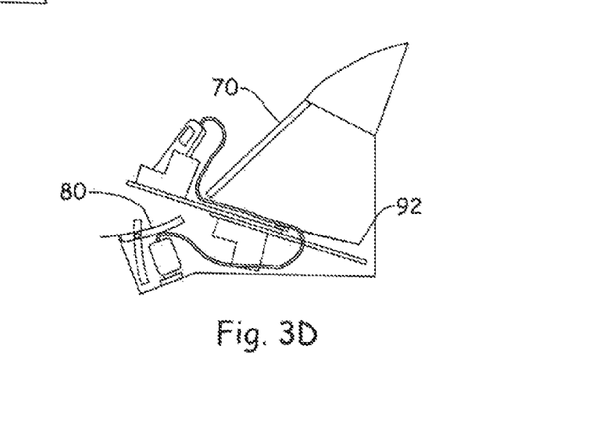
FIG. 3D is a side sectional view of an exemplary cord and media management system with two doors closed and the tray in a deployed position according to the present invention.

The power supply feature 50 functions to provide an interface to the vehicle, providing power for any number of uses, such as the devices 90 herein. It is contemplated that there may be more than one power supply feature 50 provided in the storage console with a cord and media management system 10. For example, as shown in FIGS. 3C, 3D and 8C, the power supply feature may be a power point, which is known in industry. It also may be a magnetic induction charger type system that is located somewhere in the system 10.

In one illustrative example, shown in FIGS. 3C and D, the power supply feature 50 is adapted to fit a standard power plug 52 (e.g. cell phone 12V DC car adapter) and is disposed in the lower section 22 of the base unit 12. In a preferred embodiment, it is configured in the base unit 12, such that when the standard power plug 52 is engaged and the cord 92 is fed away for the lower door 80, the lower door 80 may be closed. In another illustrative example, not shown, the power supply feature 50 may be integral to the tray assembly 30.

Interface Devices 60

The interface device(s) 60 functions to provide an interface to the vehicle, providing communications (e.g. electronic) for any number of uses, such as between the devices 90 herein and the vehicle. It is contemplated that there may be more than one interface device 60 provided in the storage console with a cord and media management system 10. It is contemplated that the interface device 60 may be configured in a similar fashion as the power supply feature 50.

Doors 70, 80

The doors 70, 80 functions at least to close out the main chamber of the base unit 12. It is contemplated that this may be accomplished with a single door or preferably with two doors (upper 70 and lower 80). In a preferred embodiment, the doors are independently rotateably attached to the base unit 12 and rotate at least partially about the outside of the unit 12 (to open up access to the main chamber). In a preferred embodiment, the lower door 80, the upper door 70, or both may be capable of opening and/or closing when the tray assembly 30 is in the deployed position 34.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, a dimension, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes.

The term "consisting essentially of" to describe a combination shall include the elements, ingredients, components or steps identified, and such other elements ingredients, components or steps that do not materially affect the basic and novel characteristics of the combination.

The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A storage console with a cord and media management system for a vehicle comprising:
    a system base unit;
    a movable tray assembly moveable between an upright position and an inverted position, wherein when the movable tray is in one of the upright and inverted positions, the movable tray is movable between one of a loaded position and a deployed position;
    at least one media device holder disposed on the movable tray assembly, wherein the at least one media device holder is rotatably connected to the movable tray assembly; and
    a power supply feature.

2. The storage console according to claim 1, further comprising at least one interface device that functions to provide an interface to the vehicle.

3. The storage console according to claim 1, comprising at least one door.

4. The storage console according to claim 1, wherein the movable tray assembly includes a cord guide.

* * * * *